United States Patent
Siller et al.

(10) Patent No.: US 10,654,723 B2
(45) Date of Patent: May 19, 2020

(54) AEROGELS

(71) Applicant: UNIVERSITY OF NEWCASTLE UPON TYNE, Newcastle Upon Tyne (GB)

(72) Inventors: Lidija Siller, Whitley Bay Tyne and Wear (GB); Xiao Han, Gateshead Tyne and Wear (GB)

(73) Assignee: University of Newcastle Upon Tyne, Newcastle Upon Tyne (GB)

( * ) Notice: Subject to any disclaimer, the term of this patent is extended or adjusted under 35 U.S.C. 154(b) by 0 days.

(21) Appl. No.: 15/548,189

(22) PCT Filed: Feb. 16, 2016

(86) PCT No.: PCT/GB2016/050383
§ 371 (c)(1),
(2) Date: Aug. 2, 2017

(87) PCT Pub. No.: WO2016/132117
PCT Pub. Date: Aug. 25, 2016

(65) Prior Publication Data
US 2018/0029893 A1 Feb. 1, 2018

(30) Foreign Application Priority Data
Feb. 17, 2015 (GB) .................. 1502613.1

(51) Int. Cl.
| | | |
|---|---|---|
| *C01B 33/158* | (2006.01) | |
| *B01J 20/08* | (2006.01) | |
| *B01J 20/10* | (2006.01) | |
| *B01J 20/28* | (2006.01) | |
| *B01J 20/30* | (2006.01) | |

(Continued)

(52) U.S. Cl.
CPC .......... *C01B 33/1585* (2013.01); *B01J 20/08* (2013.01); *B01J 20/103* (2013.01); *B01J 20/28047* (2013.01); *B01J 20/3064* (2013.01); *B01J 21/04* (2013.01); *B01J 21/08* (2013.01); *B01J 35/0013* (2013.01); *B01J 37/0018* (2013.01); *C01F 7/02* (2013.01); *C09K 3/32* (2013.01)

(58) Field of Classification Search
CPC .................................................... C01B 33/1585
See application file for complete search history.

(56) References Cited

U.S. PATENT DOCUMENTS

| | | | | |
|---|---|---|---|---|
| 4,886,865 A | * | 12/1989 | Ikeno | ..................... C08G 77/50 528/15 |
| 4,954,327 A | | 9/1990 | Blount | |

(Continued)

FOREIGN PATENT DOCUMENTS

| | | |
|---|---|---|
| CN | 1280550 A | 1/2001 |
| CN | 101238075 A | 8/2008 |
| WO | 2012/044052 A2 | 4/2012 |

*Primary Examiner* — Liam J Heincer
(74) *Attorney, Agent, or Firm* — E. Eric Mills; Nexsen Pruet, LLC

(57) ABSTRACT

This invention relates to methods of producing aerogels and composites thereof. In particular, the invention relates to methods of producing silica aerogels and composites thereof. The invention also relates to doped aerogels and doped silica aerogels. The method involves the use of alkaline solutions, and particularly aqueous alkaline solutions, during the aerogel drying process. The method is more energy efficient and cheaper than prior art methods.

20 Claims, 10 Drawing Sheets

(a) (b) (c)

(51) Int. Cl.

|          |           |
|----------|-----------|
| *B01J 21/04* | (2006.01) |
| *B01J 21/08* | (2006.01) |
| *B01J 35/00* | (2006.01) |
| *B01J 37/00* | (2006.01) |
| *C01F 7/02*  | (2006.01) |
| *C09K 3/32*  | (2006.01) |

(56) References Cited

U.S. PATENT DOCUMENTS

| | | | |
|---|---|---|---|
| 5,705,535 | A | 1/1998 | Jansen |
| 5,958,363 | A * | 9/1999 | Coronado ............ B01J 13/0091 423/594.1 |
| 6,475,561 | B1 * | 11/2002 | Schwertfeger ...... C01B 33/1585 427/220 |
| 6,670,402 | B1 * | 12/2003 | Lee ...................... B01J 13/0091 34/405 |
| 6,783,807 | B2 * | 8/2004 | Huffer ................. C23C 18/1662 427/307 |
| 7,618,608 | B1 * | 11/2009 | Keller, Sr. ........... C01B 33/1585 423/335 |
| 2001/0034375 | A1 | 10/2001 | Schwertfeger et al. |
| 2006/0264133 | A1 * | 11/2006 | Krajewski ............ C09D 183/04 442/104 |
| 2008/0081014 | A1 * | 4/2008 | Ahn ...................... C01B 33/158 423/338 |
| 2013/0330262 | A1 | 12/2013 | Kaneko et al. |
| 2016/0258153 | A1 * | 9/2016 | Koebel ................. C01B 33/145 |
| 2017/0203971 | A1 * | 7/2017 | Sakatani ................ C01B 33/16 |
| 2018/0179073 | A1 * | 6/2018 | Oh .......................... B05D 1/18 |
| 2018/0312407 | A1 * | 11/2018 | Oh ........................ F16L 59/026 |

\* cited by examiner

AEROGELS

CROSS REFERENCE TO RELATED APPLICATIONS

This application is a 35 U.S.C. § 371 U.S. national phase entry of International Application No. PCT/GB2016/050383 having an international filing date of Feb. 16, 2016, which claims the benefit of Great Britain Application No. 1502613.1 filed Feb. 17, 2015, each of which is incorporated herein by reference in its entirety.

This invention relates to methods of producing aerogels and composites thereof. In particular, the invention relates to methods of producing silica aerogels and composites thereof. The invention also relates to doped aerogels and doped silica aerogels. The method involves the use of alkaline solutions, and particularly aqueous alkaline solutions, during the aerogel drying process. The method is more energy efficient and cheaper than prior art methods.

BACKGROUND

Silica aerogels are inorganic solid materials with high porosity and low density, and they are excellent thermal insulators. Due to their outstanding ability as thermal insulators, silica aerogels have great potential as building materials. They also have many civil applications in energy-saving such as storage media, catalysis etc.

Silica aerogel was first investigated by S. S. Kistler in 1931, who suggested replacement of liquid by gas in the pores of silica gels, to retain the solid porous silica portion of the gel porous structure against the capillarity. The conventional syntheses of silica aerogel use a drying method involving displacement of the liquid of the gels by a supercritical fluid of carbon dioxide and requires both high pressures and high temperatures (Anderson et al., Hydrophobic silica aerogels prepared via rapid supercritical extraction. *Journal of Sol-Gel Science and Technology*, 2010, 53, 199-207.). Such processes thus require large amounts of energy.

In 1989, a freeze drying process for the production of silica aerogels was developed (Klvana et al., A New Method of Preparation of Aerogel-Like Materials Using a Freeze-Drying Process. *Journal De Physique*, 50, 1989, C429-C432; Egeberg and Engell, Freeze drying of silica gels prepared from siliciumethoxid. *Journal De Physique*, 50, 1989, C423-C428). However, the freeze drying methods require the use of low temperatures and for this reason they are also energy intensive processes.

Ambient pressure drying (APD) provides an alternative, less energy intensive, option for the synthesis of aerogels (Prakash et al., Silica Aerogel Films Prepared at Ambient-Pressure by Using Surface Derivatization to Induce Reversible Drying Shrinkage. *Nature*, 1995, 374, 439-443.). Conventional APD methods rely on displacing the original solvent used for gel preparation with various organic solvents which have lower surface tension, such as hexane, heptane, octane and nonane. In most conventional APD approaches, additional surface modification is also introduced to replace the —OH groups on the silica surfaces with more lipophilic groups, in order to provide an additional reduction in capillarity (Rao et al., Hydrophobic and physical properties of the ambient pressure dried silica aerogels with sodium silicate precursor using various surface modification agents. *Applied Surface Science*, 2007, 253, 6032-6040; Jung et al., The properties of silica aerogels hybridized with $SiO_2$ nanoparticles by ambient pressure drying. *Ceramics International*, 2012, 38, S105-S108.). A common reagent used for the surface modification of silica gels is trimethylchlorosilane (TMCS), $(CH_3)_3SiCl$. Surface modification by TMCS used in conventional APD process always leads to the generation of an acid (in the case of TMCS, HCl) so further organic solvents are needed in order to remove generated acid. Although less energy intensive than supercritical $CO_2$ processes, current APD processes are time consuming and costly due to the need for large amounts of organic solvents. The high cost associated with the use of organic solvents limits the use of aerogels on a large industrial scale, for example as building materials.

It is an aim of certain embodiments of this invention to provide a method of producing silica aerogels which is cheaper, quicker and/or more energy efficient than the prior art processes. It is an aim of certain embodiments of this invention to provide a method of producing silica aerogels which is more environmentally friendly than prior art processes.

BRIEF SUMMARY OF THE DISCLOSURE

In a first aspect of the invention is provided a method for the production of an oxide aerogel optionally comprising a dopant, the method comprising:
  reacting an oxide wet gel with an electrophile to generate a gas, thereby providing a porous solid oxide containing the gas, the porous solid oxide optionally comprising a dopant;
wherein the liquid component of the oxide wet gel comprises an alkaline solution.

The net reaction between the electrophile, the oxide component of the gel and/or water, and the alkaline solution, generates a gas.

The term 'oxide aerogel' is intended to mean an aerogel of a solid oxide. The term 'oxide wet gel' is intended to mean a gel in which the solid component is an oxide. Examples of solid oxides include mineral oxides and metal oxides. Thus, the oxide may be selected from alumina, silica, chromia, tin dioxide, titania, iron oxide, zirconia.

In certain preferred embodiments, the oxide is silica.

The oxide may be an oxide that can be converted to a desired oxide material. Thus the oxide may be Dawsonite. Dawsonite can be converted to alumina using literature methods.

The inventors have found that a gas can be generated in situ in a reaction between the —OH groups on the solid component of an oxide gel (if water is present, the electrophile may also react with water) and an electrophile in the presence of an alkaline solution and that that gas can displace the liquid component of the gel, facilitating the production of an aerogel. The process of drying the silica aerogel can thus be achieved at low temperature and pressure, making the process energy efficient. The reagents used, and particularly the preferred alkaline solutions, are low cost. The process thus provides a cost- and energy efficient route to the preparation of silica aerogels.

The gas filled porous solid oxide formed in the claimed reaction could be described as a partially dried aerogel. It could, in certain embodiments, be the desired end product aerogel. Typically however residual reactants and solvents are present within and on the surfaces of the first obtained porous solid (i.e. the partially dried aerogel). Thus, the process may comprise the step of converting the porous solid oxide containing the gas into the silica aerogel. This conversion step may comprise one or more steps, e.g. one or more washing and/or drying steps.

If present, the dopant will typically be situated in the pores of the aerogel. It will not usually form part of the oxide structure. The dopant will typically be a salt and will typically be in the form of crystals.

The electrophile will typically be a reagent which reacts with the oxide wet gel (e.g. the —OH groups on the surface of the oxide structure and/or any water or alcohol which is present in the liquid component) to generate an acid. In this case the acid reacts with the alkaline solution to form water and a salt and, in certain preferred embodiments of the invention, a gas. The salt is typically deposited in the pores of the silica aerogel as a dopant. Thus, the identity of the electrophile and the base may be selected to provide a desired dopant. They may, for example, be selected such that the dopant is an alkali metal halide, e.g. KCl or NaCl.

Dopants, and by extension, the electrophile and base used in the process of the invention, may be selected to improve the existing properties of the aerogel or to provide new properties, e.g. by reinforcing the aerogel or by altering its thermal and/or electrical conductivity. The claimed method may therefore provide access to doped aerogels that would be difficult to make by existing means of doping aerogels. The method may allow a synthesis of doped aerogels which is more efficient than existing methods.

If, on the other hand, it is not desired that the salt is present in the final aerogel, it can be removed as described elsewhere in this specification.

The electrophile may react with the oxide wet gel (e.g. the —OH groups on the surface of the oxide structure and/or any water or alcohol which is present in the liquid component) to generate a gas and an acid. One illustrative example of an electrophile which can react in this way is oxaloyl chloride.

The electrophile may be selected from electrophiles that react with —OH groups on the surface of the oxide structure to generate unstable adducts, e.g. adducts which are unstable under the reaction conditions. If the adduct is unstable under the reaction conditions, the electrophile acts as a source of acid only and no further processing steps are required to remove the adduct from the oxide structure.

If the electrophile reacts with —OH groups on the surface of the oxide structure to generate stable adducts, the method may comprise the step of cleaving the adducts to regenerate the —OH groups on the surface of the oxide structure.

The electrophile may be a silylating agent. Illustrative silylating agents are those having the formula $R_3SiX$, wherein R is independently at each occurrence selected from a $C_1$-$C_4$-alkyl group and halide; and X is independently selected from halide, sulfonate and sulfate groups. R may independently at each occurrence be selected from $C_1$-$C_2$-alkyl and halide, e.g. chloride. R may independently at each occurrence selected from methyl and halide. R may be at each occurrence $C_1$-$C_2$-alkyl, e.g. methyl. X may be halide, e.g. chloride or bromide. X may be chloride. X may be sulfonate. Illustrative sulfonate groups include methyl sulfonate, trifluoromethylsulfonate, benzylsulfonate and toluenesulfonate. X may be sulfate, e.g. X may be —O—S(O)$_2$—OSiR$_3$. Specific electrophiles which can be used in the processes of the invention include: trimethylchlorosilane (TMCS), dimethyldichlorosilane, methyltrichlorosilane and bis(trimethylsilyl)sulfate.

Many conventional APD methods use silylating agents and in particular trimethylchlorosilane in the production of oxides, e.g. silica aerogels. The purpose of the silylating agent in traditional APD is to lower the hydrophillicity of the oxide structure by capping the —OH groups. The low surface tension solvents which are used in conventional APD methods are usually lipophilic alkanes and the lowering of the hydrophilicity of the silica encourages the displacement of water or ethanol in the wet gel with the lipophilic alkane. In the present invention, without wishing to be bound by theory, it is believed that the silylating agent has a different purpose, namely to act as an in situ source of an acid (for trimethylchlorosilane the acid generated is HCl). The acid can then react with a base comprising carbonate or bicarbonate ions to generate $CO_2$ gas.

It may be that heat is generated in the process of reacting the electrophile with the oxide wet gel. If so, that heat can be recovered by conventional means. Recovered heat may be diverted to one of the other optional steps in the method steps of the invention, e.g. the drying step.

The alkaline solution may be a solution in a $C_1$-$C_4$-alcohol, e.g. ethanol or methanol. Typically, however, the alkaline solution is an aqueous solution. Typically, the alkaline solution will comprise carbonate ions, bicarbonate ions or a mixture thereof. Carbonate and bicarbonate solutions generate $CO_2$ gas when they are contacted with an acid. Where the electrophile reacts with the silica to generate an acid, the alkaline solution is preferably a carbonate or bicarbonate solution. In this case, without wishing to be bound by theory, it is the reaction between the acid and the carbonate/bicarbonate ions which generates the gas, in this case $CO_2$. The alkaline solution may be an ammonium carbonate solution or a metal carbonate solution. Where the alkaline solution is a metal carbonate solution, the metal carbonate or bicarbonate will preferably be selected from those which have a high solubility in the solvent in question. The metal carbonate or bicarbonate may be a transition metal carbonate or bicarbonate. An exemplary transition metal carbonate is nickel carbonate. The alkali metal carbonates or mixtures thereof. The metal carbonate or bicarbonate will typically be selected from the alkali metal carbonates or mixtures thereof. Thus, the aqueous alkaline solution may comprise sodium carbonate, sodium bicarbonate, potassium carbonate, potassium bicarbonate and mixtures thereof. In a particularly, preferred embodiment, the alkaline solution is an aqueous sodium bicarbonate solution.

The alkaline solution may be an aqueous solution having a concentration in the range from 1% to 10% w/v of a carbonate or bicarbonate salt (selected from those mentioned in the previous paragraph). More particularly, it may have a concentration in the range from 4% to 7% w/v of a carbonate or bicarbonate salt.

The use of alcohol or aqueous solutions in an APD type method of forming oxide aerogels is contrary to the received wisdom. In conventional APD methods, a solvent with low surface tension is used to prevent the surface tension induced collapse of the oxide pores. As a comparative example, octane (conventionally used solvent) has a surface tension of 22 mNm$^{-1}$. An aqueous sodium bicarbonate solution, on the other hand, has a surface tension of 72 mNm$^{-1}$, more than three times that of octane. Without wishing to be bound by theory, it is believed that the in situ generation of the gas in the pores in the present process forces the solvent out of the structure and that the resultant pressure increase prevents the surface tension induced collapse of the oxide pore structure as the solvent leaves. Alcohol/aqueous basic solutions are typically significantly cheaper than the alkane solvents used in conventional APD processes.

In certain preferred embodiments, the electrophile has the formula $R_3SiX$ and the alkaline solution is an aqueous carbonate or bicarbonate solution. In certain further preferred embodiments, the oxide is silica.

The gas generated will typically be $CO_2$.

The step of reacting the electrophile with the wet get may comprise pouring a liquid comprising the electrophile over the wet gel. It may comprise placing the wet gel in a liquid comprising the electrophile. Where the electrophile is itself a liquid (e.g. as is the case with TMCS), the liquid comprising the electrophile may be pure or substantially (i.e. >90%) pure electrophile.

It may be that the volume ratio of the electrophile (e.g.TMCS) to the oxide wet-gel may be in the range of from 0.01 to 3. More particularly, the volume ratio of the electrophile to oxide wet gel is in the range of from 0.1 to 0.3.

The method may comprise the step of drying the porous solid oxide containing a gas to provide the aerogel. The drying step may comprise heating the porous solid oxide. It may be that the porous solid oxide is heated to a temperature of less than 100° C. It may be that the porous solid oxide is heated to a temperature from 30° C. to 80° C., e.g. from 50° C. to 70° C.

The method may comprise the step of providing the oxide wet gel having a liquid component which comprises an alkaline solution. Thus, in certain embodiments the method may comprise the step of:
    treating a precursor oxide wet gel with an alkaline solution to provide an oxide wet gel having a liquid component which comprises an alkaline solution.

In this way, the oxide wet gels used in the processes of the invention can be prepared from other oxide wet gels, e.g. those that do not have a liquid component that comprises an alkaline solution. It is expected that any precursor oxide wet gel, can be converted to a wet gel suitable for use in the processes of the invention, however that precursor wet gel has been obtained. This allows the combination of the present invention with known efficient and scalable methodologies of forming oxide wet gels.

The precursor oxide wet gel may be an alcohol gel, e.g. an ethanol gel or a methanol gel. Alternatively, the precursor oxide wet gel is a hydro-gel. Of course, the liquid component of the precursor oxide wet gel may comprise a mixture of solvents, e.g. a mixture of an alcohol, for example ethanol, and water.

The step of treating the precursor oxide wet gel may comprise placing the precursor oxide wet gel in the alkaline solution. The precursor oxide wet gel may be left in the alkaline solution for a period of time between 1 hour and 4 days, e.g. between 5 hours and 2 days. The precursor oxide wet gel may be left in the alkaline solution for a period of time between 12 hours and 36 hours.

The method may comprise the step of forming the precursor oxide wet gel. The skilled person will be familiar with the conventional methods of forming oxide wet gels. Typically, the formation of an oxide wet gel involves the polymerisation of an oxide monomer, optionally in the presence of a catalyst, in a liquid.

As an example, silica wet gels may be obtained by the following process:
    hydrolysing a tetraalkoxy silane optionally in the presence of a catalyst to form the silica wet gel.

This process may produce a suitable wet gel in a single step. Alternatively, this process may in fact involve more than one process steps. Thus, the process may comprise the steps of:
    hydrolysing a tetraalkoxy silane optionally in the presence of a catalyst to form an immature silica wet gel; and
    allowing the immature silica gel to age to form the wet silica gel. The oxide monomer in this case is the tetraalkoxy silane.

The tetraalkoxy silane may be tetraethoxysilane. The hydrolysis reaction may be carried out in a mixture of ethanol and water, e.g. a mixture having an ethanol:water ratio of from 5:1 to 1:5, e.g. a ratio of from 2:1 to 1:2. Thus, the hydrolysis may be carried out in a 1:1 mixture of ethanol to water.

The hydrolysis step may be performed in a mould. In this case, the silica wet gel or the immature silica wet gel may be removed from the mould before being aged. The immature silica wet gel may be washed, e.g. with ethanol, before it is allowed to age. In embodiments in which the hydrolysis step is performed in a mould, this washing step may occur before or after it has been removed from the mould.

The hydrolysis step may be carried out in the presence of a catalyst. The catalyst may comprise an ammonium salt, e.g. ammonium hydroxide and/or ammonium fluoride.

As an alternative example, silica wet gels may be obtained by the following process:
    treating sodium silicate with an acid to form an immature silica wet gel; and
    allowing the immature silica gel to age to form the silica gel. The oxide monomer in this case is the sodium silicate.

In certain embodiments, the wet gel is formed in the same process step as the reaction involving the electrophile and the alkaline solution. Thus, the method may comprise:
    reacting an oxide monomer, an electrophile and an alkaline solution to generate a porous solid oxide comprising a gas, the porous solid oxide optionally comprising a dopant.

Typically in these embodiments, the electrophile reacts with the solvent and/or the oxide polymer to generate an acid which both catalyses the polymerisation of the oxide monomer and reacts with the alkaline solution to form a gas and a salt. Thus, the oxide wet gel is formed in situ and the gas generation reaction occurs approximately simultaneously, pushing the liquid out of the gel.

A specific example in which this approach can be particularly advantageous is where the oxide monomer is sodium silicate, the electrophile has the formula $R_3SiX$ and the alkaline solution is an aqueous carbonate or bicarbonate solution. The product of this process would be a silica aerogel.

As mentioned above the methods of the invention may result in the formation of porous solid oxides comprising a dopant. Where these porous solid oxides are converted to oxide aerogels, the oxide aerogels also comprise the dopant. The method may thus comprise the step of reducing the amount of the dopant present in the oxide aerogel. Where the process includes a drying step, this may be performed either on the porous solid oxide, before it is dried, or on the oxide aerogel, after the porous solid oxide has been dried. Thus, the method may comprise the step of reducing the amount of the dopant in the porous solid oxide to provide a porous solid oxide having a reduced amount of the dopant. The porous solid having a reduced amount of the dopant may be converted into an oxide aerogel as described elsewhere in this specification. Likewise, the method may comprise the step of reducing the amount of the dopant in the oxide aerogel to provide an oxide aerogel having a reduced amount of the dopant.

The step of reducing the amount of dopant may comprise washing either the porous solid oxide or the oxide aerogel with a solvent, e.g. with water. The step of washing may involve placing the porous solid oxide or the oxide aerogel in the solvent for a predetermined period of time, e.g. for a period of time between 1 hour and 4 days. The predetermined period of time may be between 5 hours and 2 days or between 12 hours and 36 hours. During that period of time, the solvent may be refreshed by removing the porous solid or oxide aerogel from the solvent, refreshing the solvent and replacing the porous solid or oxide aerogel.

Where the oxide is an oxide that can be converted to a desired oxide material, it may be that the method includes converting the oxide aerogel to an aerogel of the desired oxide material. Thus, where the oxide is Dawsonite, it may be that the method includes converting the Dawsonite aerogel to an alumina aerogel. This may be achieved by sintering the precursor (e.g. Dawsonite) aerogel at high temperature (e.g. >80° C.) optionally in the presence of an activator base (e.g. NaOH).

The method is capable of producing bulk, powdered, and thin film aerogels.

The method may comprise the step of powdering the oxide aerogel to form a powdered oxide aerogel.

The method may be a method of making a composite comprising an oxide aerogel.

The composite may be an oxide aerogel-fibre composite, e.g. an oxide aerogel composite in which fibres are supported in the oxide matrix. Thus, in the method of the first aspect both the oxide wet gel and the porous solid oxide may comprise fibres supported in the oxide matrix. The fibres may be selected from ceramic fibres, organic fibres or carbon fibres. In certain preferred embodiments, the fibres are ceramic.

Alternatively, the composite may comprise the aerogel supported on a substrate. Thus, the method may comprise the step of incorporating the oxide aerogel into a composite, e.g. by affixing the oxide aerogel to a substrate. The substrate may be any convenient material. Thus, the substrate may be selected from glass, ceramic, plastic, metal, wood etc. The substrate may be any material used in construction, e.g. roofing materials, flooring materials, walling materials and other structural materials.

The aerogel may have a surface area greater than 200 $m^2/g$. The aerogel may have a surface area greater than 300 $m^2/g$. The aerogel may have a surface area greater than 400 $m^2/g$. The aerogel may have a surface area greater than 500 $m^2/g$. The aerogel may have a surface area greater than 600 $m^2/g$. The aerogel may have a surface area up to 1500 $m^2/g$, e.g. up to 1000 $m^2/g$.

The aerogel may have a density of up to 0.8 $g/cm^3$. The aerogel may have a density of up to 0.7 $g/cm^3$. The aerogel may have a density of up to 0.6 $g/cm^3$. The aerogel may have a density of up to 0.5 $g/cm^3$. The aerogel may have a density of up to 0.4 $g/cm^3$. The aerogel may have a density greater than 0.01 $g/cm^3$, e.g. greater than 0.1 $g/cm^3$.

The aerogel may have a thermal conductivity of up to 0.5 W/m·K. The aerogel may have a thermal conductivity of up to 0.1 W/m·K. The aerogel may have a thermal conductivity of up to 0.05 W/m·K. The aerogel may have a thermal conductivity of up to 0.02 W/m·K. The aerogel may have a thermal conductivity of greater than 0.001 W/m·K, e.g. greater than 0.005 W/m·K.

In a second aspect of the invention is provided a doped oxide aerogel.

The dopant will typically be situated in the pores of the aerogel. It will not usually form part of the oxide structure.

The dopant will typically be a salt. The salt will typically be in the form of a solid, e.g. in the form of crystals.

The doped oxide aerogel may be a doped silica aerogel.

The dopant may be an alkali metal halide salt, e.g. KCl or NaCl.

The doped oxide aerogel may be obtainable or obtained by the methods of the first aspect of the invention.

In a third aspect of the invention is provided a composite comprising a doped oxide aerogel.

The doped oxide aerogel in the composite of the third aspect will typically be a doped oxide of the second aspect.

BRIEF DESCRIPTION OF THE DRAWINGS

Embodiments of the invention are further described hereinafter with reference to the accompanying drawings, in which.

DETAILED DESCRIPTION

Figure 1:
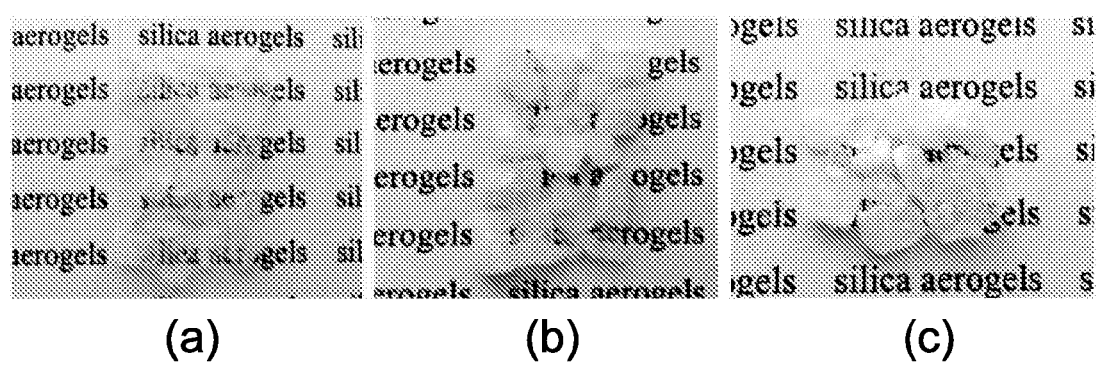
FIG. 1 shows optical images of (a) silica aerogel sample A1; (b) silica aerogel sample A2; (c) silica aerogel sample A3.

An aerogel is a porous solid. It can be characterised as being comprised of a microporous solid in which the dispersed phase is a gas. An 'aerogel' is so-called because they are usually made by displacing the liquid in a gel (a gel being a liquid dispersed in a solid) with a gas.

In the context of gels and aerogels, the term 'wash' typically refers to a process in which the gel/aerogel is placed in a liquid and left in the liquid for a predetermined length of time. The liquid is removed (e.g. by pipette) when each 'wash' step is completed.

The aerogels of the invention may be used as thermal insulators, e.g. in the context of power generation or in construction or in reducing heat loss from industrial processes or vehicles. The aerogels of the invention may be used as absorbent materials, e.g. in the clean-up of oil spills. The aerogels of the invention may be used as catalyst supports.

The term '$C_x$-$C_y$-alkyl' in this specification refers to a branched or linear hydrocarbon chain having from x to y carbons. The alkyl groups are typically unsubstituted. Exemplary alkyl groups include methyl, ethyl, n-propyl, iso-propyl, n-butyl, isobutyl etc. Likewise, the term $C_x$-$C_y$-alcohol refers to a molecule having the formula $C_x$-$C_y$-alkyl-OH. Exemplary alcohols include methanol, ethanol, n-propanol, iso-propanol etc.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

EXAMPLES

Example 1

Multi-Step Silica Aerogel Preparation Using TEOS as a Source of Silicon

Silica Gel Preparation

All materials and solvents were purchased from Sigma-Aldrich and used without any further purification. Silica gels were prepared by the hydrolysis of the precursor tetraethoxysilane (TEOS, ≥98%), ethanol (≥99.5%) and de-ionic (DI) water with a molar ratio as TEOS:ethanol:water=2:38:39. In order to speed gelation 34 ml of prepared precursor with 1 ml of catalyst (catalyst was a mixture of ammonium hydroxide (28-30%), ammonium fluoride (≥98%) and water with a molar ratio as $NH_4OH:NH_4F:H_2O$=8:1:111) were used. In approximate 5 minutes, silica gels were removed from the casting mould and then washed and aged with 500 ml of ethanol for 24 hours.

Drying Process

After 24 hours of aging ethanol (solvent) was replaced by a mixture of 500 ml DI water and 22 g sodium bicarbonate 99.7%). Silica gels were subsequently soaked in the bicarbonate solution while stirred for 24 hours. At the end of solvent exchange the silica gels were placed out of sodium bicarbonate solution and trimethylchlorosilane 97%, TMCS) (6 ml/8 ml/10 ml) was slowly poured onto the top of the gels which enabled bubbling of the generated carbon dioxide from inside of the gels. 2 minutes later after a big burst of $CO_2$ generated by bubbling, ethanol was added as protecting solvent from drying in air, but however still some more $CO_2$ gas was released from the gels for the following 24 hours. Finally the gels were dried at 60° C. and at ambient pressure with ethanol for 24 hours to obtain the silica aerogels.

Salt Removal

If desired, the produced sodium chloride can be removed by washing with water three times for 24 hours in total before the gel was heated, or the same procedure can be performed on the silica aerogel formed after the gel had been dried.

Example 2

One Pot Silica Aerogel Preparation Using Water Glass as a Source of Silicon 3 ml of trimethylchlorosilane (TMCS) was added in to 5 ml of water glass (sodium silicate: $Na_2O$ ~10.6%, $SiO_2$ ~26.5%). A thin layer of solid immediately formed on the surface. Then 5 ml of sodium bicarbonate solution was added in, and the solid layer was subsequently broken by using a glass rod. With stirring, the gel was formed in seconds, and aged for approximately 2 hours. The produced sodium chloride was removed by washing the gel with water three times. The gel was dried at 60° C. and under ambient pressure for 24 hours to obtain the silica aerogels.

Example 3

Characterisation and Discussion

Characterisations

FEI XL30 ESEM-FEG (Environmental Scanning Electron Microscope-Field Emission Gun) was used to image the samples in high vacuum mode and 10 KeV accelerating voltage at Newcastle University. Before the SEM imaging, the samples were coated with gold to increase electrical conductivity. Coulter™ SA 3100™ Surface Area and Pore Size Analyzers were used to measure BET (Brunauer-Emmet-Teller) surface area at the Newcastle University. The PANalytical X'Pert Pro Multipurpose Diffractometer (MPD) is used for X-ray powder diffraction (XRPD) analysis at the Newcastle University. The High resolution transmission electron microscopy (HRTEM) and scanning transmission electron microscopy (STEM) experiments were carried out in a Tecnai F30 300 keV microscope at the Materials Science Centre, University of Manchester. The samples for HRTEM and STEM were prepared with ultrasonication of silica aerogels in de-ionised water for a long time until there were no large pieces of aerogel seen by eye.

Results and Discussion

Figure 2:
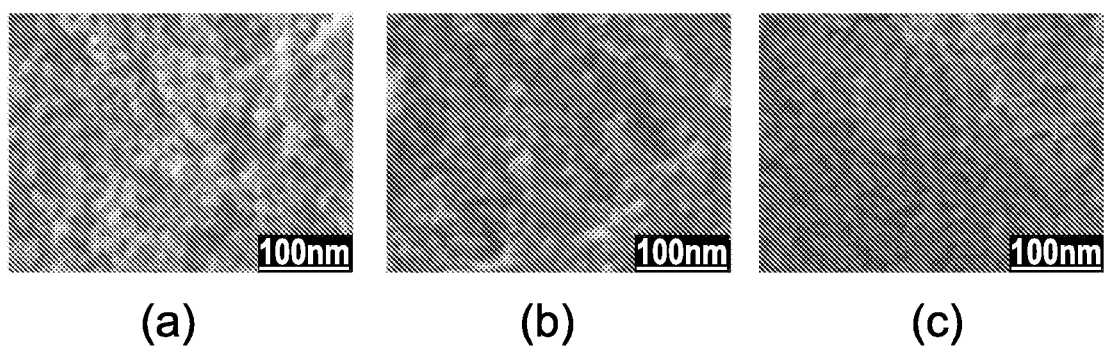
FIG. 2 shows scanning electron microscope (SEM) images of (a) silica aerogel sample A1; (b) silica aerogel sample A2; (c) silica aerogel sample A3.

According to the different amounts of TMCS added, the silica aerogels prepared in Example 1 by adding 6 ml, 8 ml and 10 ml of TMCS and are named as A1, A2 and A3, respectively. FIG. 1 shows photograph images of all three samples. With the increase of amount of TMCS the transparency of samples is reduced. FIG. 2 shows SEM images of all three samples. It is clear that silica aerogel samples exhibit highly porous structures. Samples A1 and A2 have larger porous size than sample A3 due to the largest surface modification by TMCS.

In table 1, the density and BET surface area of silica aerogels is reported. The density of samples was calculated from ratio of weight to volume. The density rises with the increase of amount of TMCS is due to the formation of NaCl crystals in pores of silica aerogel (see discussion below). Aerogel sample A2 has the highest surface area and sample A3 has the lowest surface area. This BET measurements are consistent with the porous structures observed with the SEM images.

TABLE 1

Density and BET surface area of silica aerogels

| Samples | Density (g/cm$^3$) | BET Surface Area (m$^2$/g) |
|---|---|---|
| Silica aerogel (A1) | 0.32 | 555 |
| Silica aerogel (A2) | 0.49 | 585 |
| Silica aerogel (A3) | 0.63 | 470 |

Capillarity is the primary mechanism when silica gels undergo the drying process. Referring Young-Laplace equation, if the porous shape in aerogels is assumed to be cylinder, the pressure of capillarity in those pores (P) satisfies a relation with surface tension of solvent ($\gamma$), contact angle between solvent and surface ($\theta$), and radius of surface (R) of pores:

$$P = 2\gamma \cos \theta / R \quad \text{(Young-Laplace equation)}$$

In conventional APD method, solvent in pores directly evaporates from the surface when gels are heated. Various kinds of low-surface-tension (LST) solvents have been investigated in the past and successful synthesis of silica aerogels have been reported. For instance, in 2012, Jung (Jung et al., The properties of silica aerogels hybridized with SiO$_2$ nanoparticles by ambient pressure drying. *Ceramics International*, 2012, 38, S105-S108) fabricated five silica aerogels by conventional APD method with hexane solvent which gave a BET surface area results ranging from 531 m$^2$/g to 772 m$^2$/g, and densities ranging from 0.27 g/cm$^3$ to 0.35 g/cm$^3$. These aerogels have very similar properties as silica aerogels do in our work, so by comparison of the properties sodium bicarbonate solution lowers capillarity as effectively as conventional organic solvents used in APD method.

Figure 3:
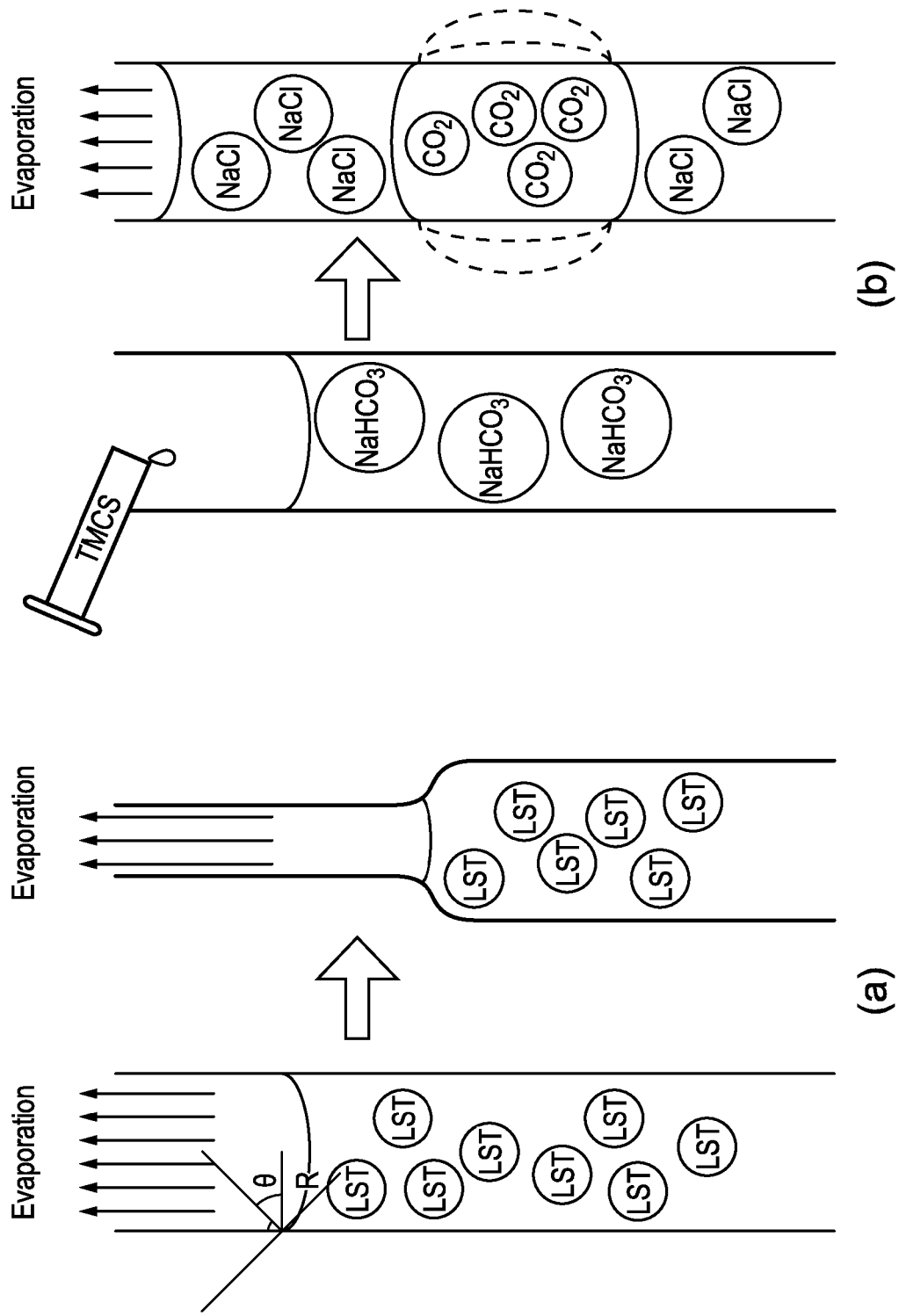
FIG. 3 provides a schematic explanation of comparison between (a) a conventional APD method with organic low surface tension solvent; (b) an APD method of the present invention, using am aqueous sodium bicarbonate solution.
Figure 4:
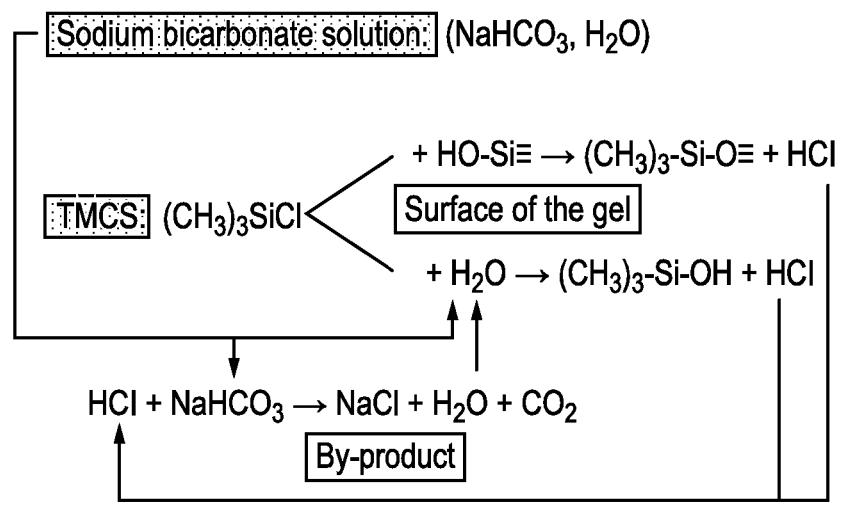
FIG. 4 shows the proposed net chemical reactions for the methods of the invention using sodium bicarbonate solution with $((CH_3)_3SiCl)$.
Figure 5:
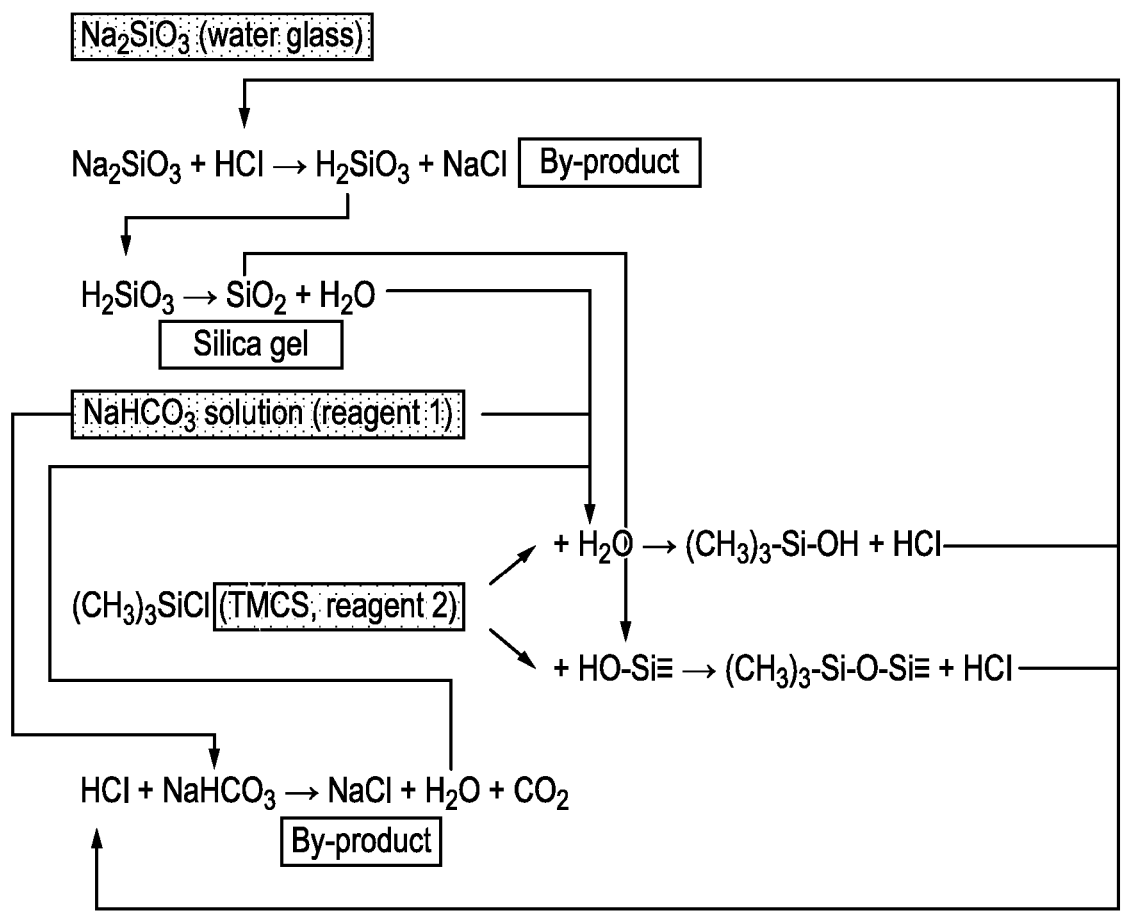
FIG. 5 the proposed chemical net-reactions of all-in-one sol-gel process.

In FIG. 3 is presented a schematic diagram of the mechanisms of a) the conventional APD method with LST solvent and b) the APD method with sodium bicarbonate solution. FIG. 4 is the proposed reaction mechanism with the sodium bicarbonate solution with TMCS by APD method. It is known that when TMCS reacts with water and/or hydroxyl group on the surface of the silica gel the hydrogen chloride is formed. Once the HCl is formed it reacts with sodium bicarbonate solution and produces sodium chloride, carbon dioxide gas in the pores of the silica gel and additional water molecules as by products. Moreover water, as a by-product of reaction, reacts with remaining TMCS to further continue producing hydrogen chloride. This is a self-driving process allowing carbon dioxide to be released from the within the silica gel while hydrogen chloride slowly diffuses into the bulk of the gel.

A control experiment of the reactions between solid sodium bicarbonate (powder form), pure TMCS (100%) and water vapour from air was conducted. Any one of the three components would activate the net-reaction with either of the other two, as proposed in FIG. 4. Because it is hard to control the presence of water in ambient environment, the water molecules for this experiment are provided by the air. After 6 seconds after initial addition of TMCS to sodium bicarbonate powder, the visible chain reaction starts due to time needed for the water molecules from the air to diffuse to the TMCS with sodium bicarbonate, as it has been proposed in FIG. 4. After another 7 seconds, the amount of carbon dioxide generated reaches a maximum.

Figure 6:
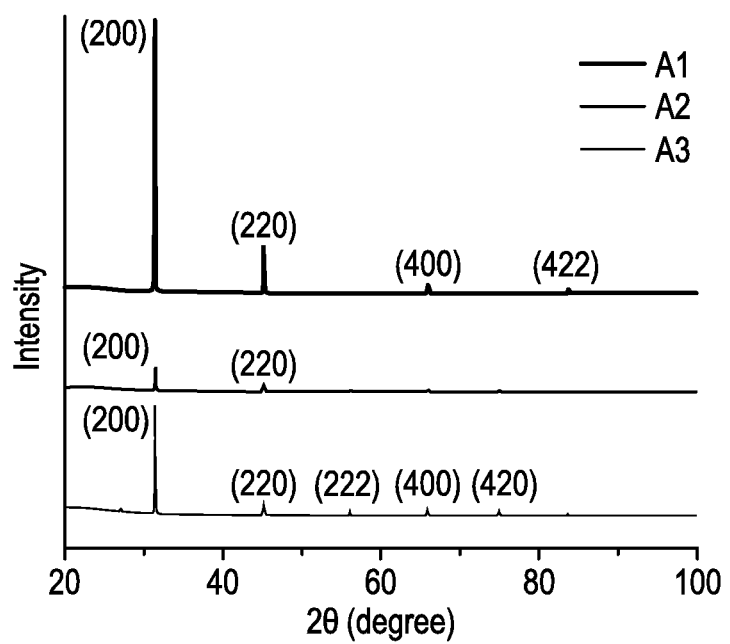
FIG. 6 shows the X-ray diffraction (XRD) spectra of silica aerogel samples A1, A2 and A3.

When carbon dioxide forms in the middle of a pore of the gel, the region filled by gas has conquered the capillarity because the CO$_2$ gas is uncompressible and therefore the pore diameter is increased. From the Young-Laplace equation (above) capillarity is reduced by enlarging radius of the pore (which gives the same result as the reducing the surface tension). This is how this proposed method, successfully fabricates aerogels without commonly used LST solvents. Sodium chloride which is the by-product of this process is more environmentally friendly than HCl. In FIG. 6 the X-ray diffraction (XRD) results of samples A1, A2 and A3 confirm crystalline planes (200), (220) and (222) of NaCl and presence of amorphous SiO$_2$ in these silica aerogels.

Figure 7:
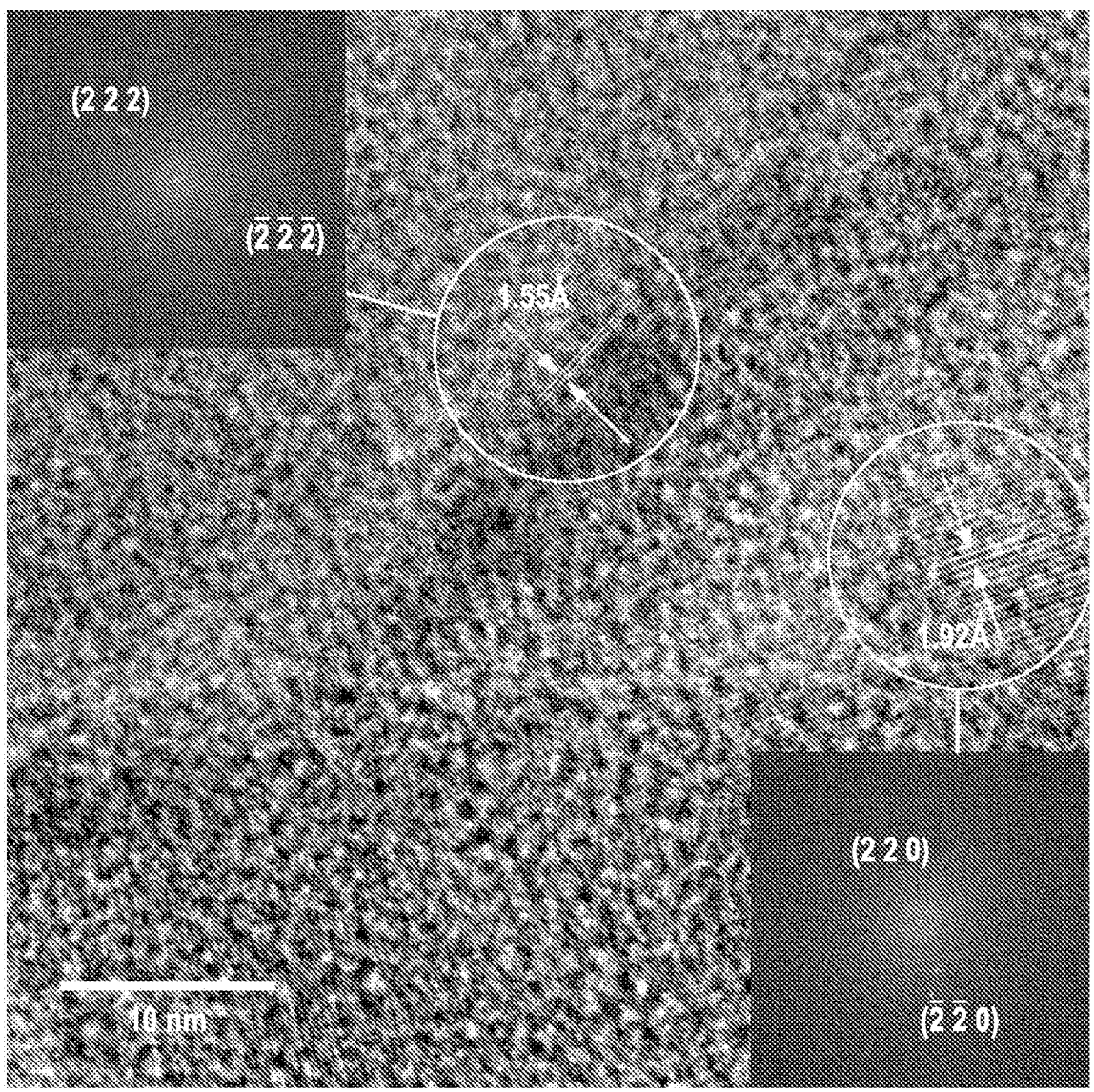
FIG. 7 shows the high-resolution transmission electron microscopy (HRTEM) image of silica aerogel sample A2 and the corresponding fast Fourier transform pattern of regions that match the pattern expected for the (222) and (220) lattice planes of crystalline NaCl presented in the inset.
Figure 8:
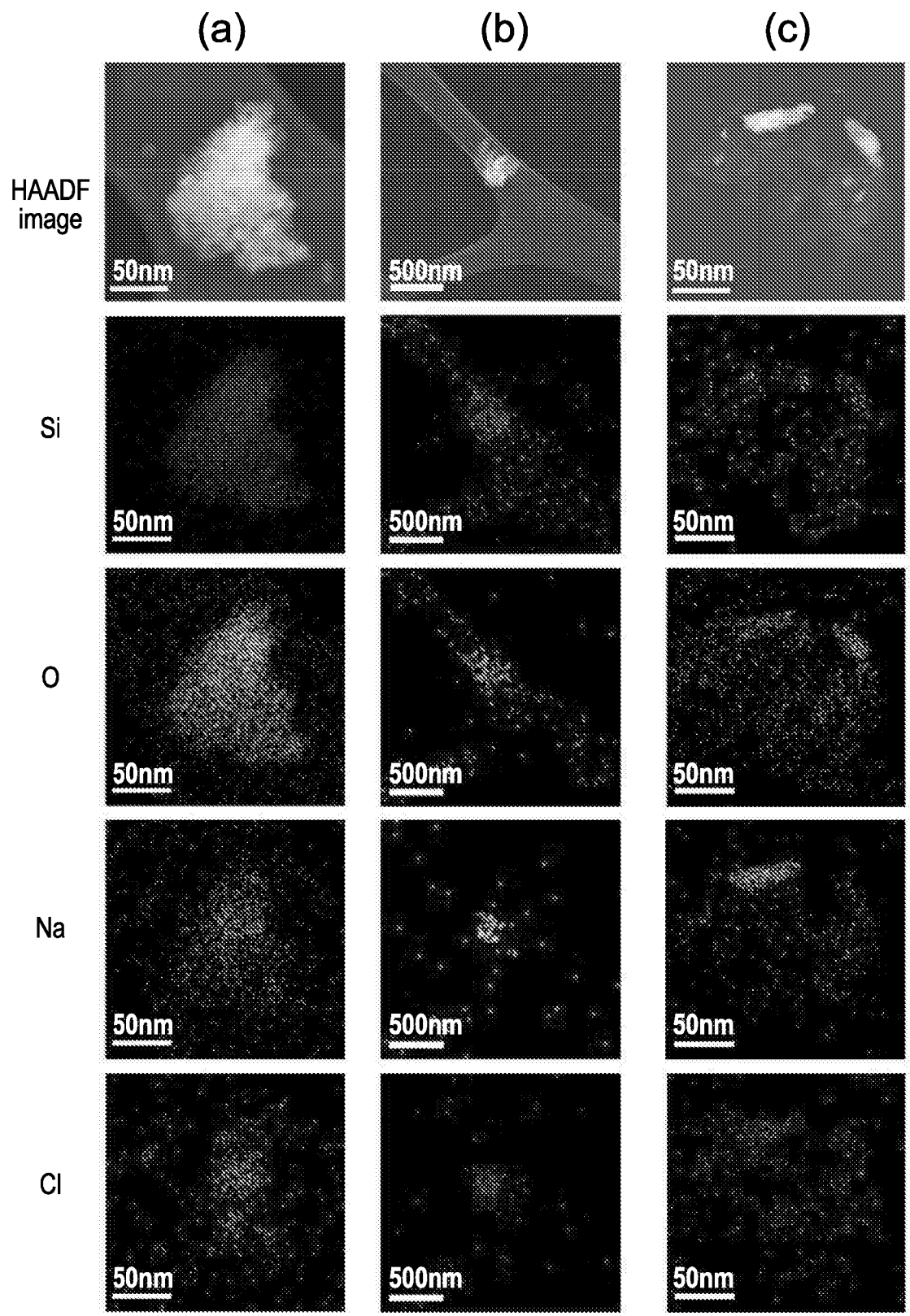
FIG. 8 shows scanning transmission electron microscopy (STEM) images and the corresponding energy-dispersive X-ray spectroscopy (EDX) mapping images: (a) silica aerogel sample A1; (b) silica aerogel sample A2; silica aerogel sample A3.

In order to prove that the NaCl is presented within the silica aerogel and is not produced just on the surface, HRTEM and STEM measurements of the same sample are obtained. FIG. 7 shows HRTEM images of silica aerogel. The two insets of FIG. 7 show the Fourier transforms of regions that match the pattern expected for the (222) and (220) lattice planes of the NaCl crystals. In FIGS. 8 (a), (b) and (c) STEM images and the corresponding EDX mapping images of samples A1, A2 and A3, respectively, are presented. The first column of FIG. 8 shows high angle annular dark field (HAADF) images. The throughout porous structure of aerogel has been confirmed by HAADF images (sample A1, the first row). Other 4 columns show elemental distribution maps, obtained via EDX, of the silica aerogels, namely Si, O, Na and Cl. It is clear that Na and Cl (compare the 4th and the 5th row in FIG. 8) have also spatial correlation with Si and O (see the 2nd and the 3rd row of FIG. 8) and also show porosity (silica aerogel). In particular it is important to notice that the material for HRTEM/STEM was ultrasonicated in DI water for long time so any surface NaCl would dissolve in the water. The origin of the Na and Cl in FIG. 8 therefore must originate from the bulk of silica aerogel. Therefore the STEM images and HRTEM images prove that the sodium chloride is formed by the reaction of sodium bicarbonate and generated hydrogen chloride in pores of silica aerogels.

Example 4

Multi-Step Silica Aerogel Preparation Using Water Glass as a Source of Silicon

Water glass (sodium silicate, Sigma Aldrich: Na$_2$O ~10.6%, SiO$_2$ ~26.5%) was diluted with deionised water (1:4 water glass: DI water). Ion exchange was carried out with Amberlite (Strongly Acidic Styrene Type Cation Exchange Resin). The silica sol had a pH in the range of 2-3 after finishing the ion exchange process. The sol was transferred to a beaker and stirred for 5 min. For the gelation step, a solution of both ammonium hydroxide and ammonium fluoride solution was used to modify the pH of the sol to 6. The silica sol was transferred to a plastic mold (50 mm in diameter) for gelation. The gelation was completed within 15 min then the hydrogel was soaked in water for 24 h to age. The water was exchanged with a sodium bicarbonate solution (4.4 g for each 100 ml water) as described in Example 1. After magnetic stirring for 24 h, the hydrogel was moved to an empty petri dish. For surface modification and $CO_2$ generation step, the hydrogel was soaked in a solution of TMCS (6 ml) in ethanol (150 ml) for 8 h. The hydrogel was rinsed and washed with deionised water several times to remove the salt from the pores, as described above in Example 1. The resultant gas filled porous oxide was soaked in ethanol for 24 h and then dried at 60° C. for a further 24 h. The final silica aerogel had a BET surface area of 678 $m^2$/g. The aerogel made in this example is silica aerogel sample (B)

Example 5

Thermal Conductivity of Silica Aerogel

Figure 9:
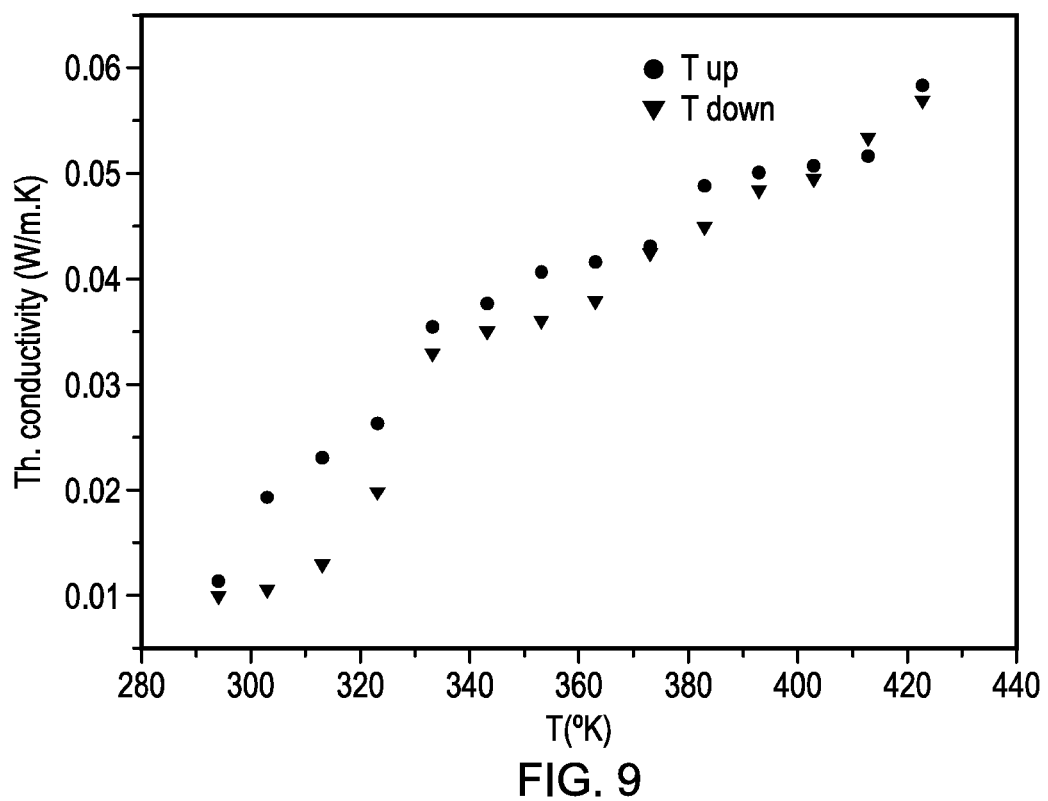
FIG. 9 shows the thermal conductivity of silica aerogel sample B for range of temperatures.

Thermal conductivity at room temperature for silica aerogel sample (B) is 0.012 W/m·K. The thermal conductivity measurements in FIG. 9 were obtained with a transient plane source technique (S. E. Gustafsson: Transient plane source techniques for thermal conductivity and thermal diffusivity measurements of solid materials. Rev. Sci. Instrum. 62(3), 797 (1991) using HotDisk Model TPS 2500 S. FIG. 9 shows the thermal conductivity as a function of temperature up to 420K. Circles represent data when the temperature was raised from RT to 420K and Triangles when the starting temperature was 420K and sample was cooled. The thermal conductivity is lower in cooling cycle because during the first heating some of the adsorbed water in pores of the silica aerogel have evaporated leaving the aerogel less humid, which lowers thermal conductivity.

Example 6

Dawsonite Aerogel—A Precursor to an Alumina Aerogel

Dawsonite, a sodium aluminium hydroxy carbonate NaAl$(CO_3)(OH)_2$, is precursor to alumina. Upon heating to 700° C., Dawsonite can be converted to $\gamma$-$Al_2O_3$ [Zhanglong Yu, Yajing Lv, Yongmei Chen, and Pingyu Wan, "Laboratory Studies on the Preparation Procedures of Alumina Converted from Aluminum Citrate", Ind. Eng. Chem. Res. 2010, 49, 1832-1836]. Our method disclosed in this Example prepares the Dawsonite aerogel.

Preparation of the sol involved stirring a mixture of aluminum sec-butoxide, deionised water, ethyl acetoacetate and ethanol in a molar ratio of 1:0.6:0.58:16, for 45 min at 60° C. Hydrolysis and condensation step was carried out by mixing the sol under stirring with a mixture of methanol, water, acetic acid, and N,N-dimethylformamide (DMF) of weight ratio Sol:MeOH:$H_2O$:DMF=1:0.2:0.003:0.03. 1 mL of acetic acid was added for each 30 mL of the mixture under magnetic stirring for 30 min at room temperature. Then the homogeneous sol was transferred to airtight boxes and kept for 7 days at room temperature to complete the gelation process. The resultant gel was then soaked in sodium bicarbonate solution (4.4 g for each 100 ml water) under stirring for 24 h. The resultant gel comprising the bicarbonate was put into an ethanol solution containing TMCS (4 mL TMCS in 100 ml ethanol) for 24 h at 21° C. The gel was rinsed with ethanol to remove the unreacted TMCS and then soaked with water and stirred for 8 h for washing. Lastly, the gel is immersing in ethanol for 24 h then dried at room temperature for 72 h and 100° C. for 2 h under ambient pressure.

Figure 10:
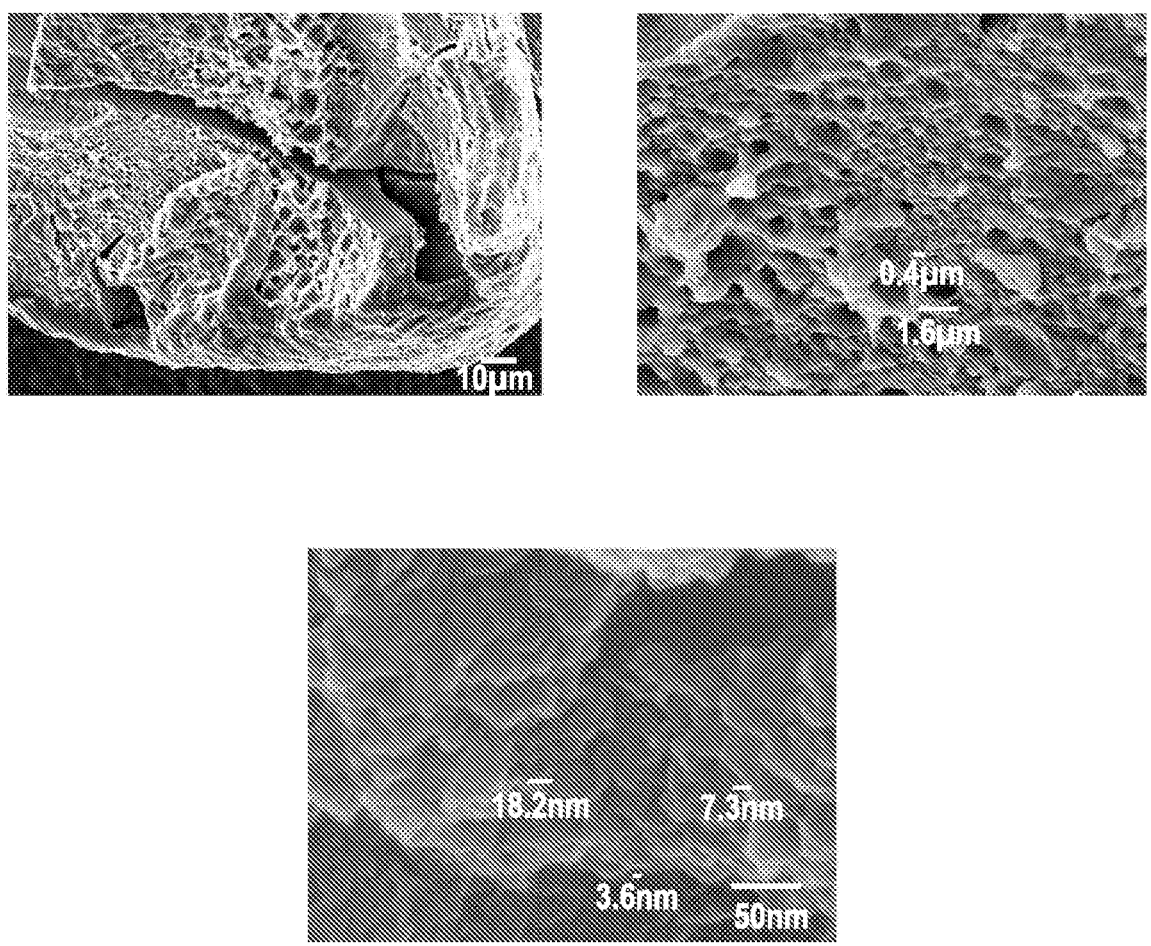
FIG. 10 shows SEM images of the Dawsonite aerogels of Example 6.

BET, and Barrett-Joyner-Halenda (BJH) analysis were carried out to measure the asurface area and pore size of the Dawsonite aerogel. Mesoporous Dawsonite of high surface area of 345 $m^2$/g and average pore diameter of 4 nm was obtained. SEM images (FIG. 10) show the macropores and mesopores structure of Dawsonite aerogels.

An alumina aerogel can be formed from the Dawsonite aerogel produced in this example by taking a mixture of (0.05 mol) of Dawsonite aerogel and (0.05 mol) of NaOH and sintering the mixture in a muffle furnace in the temperature range from 100 to 300° C. for 0.5-3 h. After cooling to room temperature, the sinter can be washed with deionized water. The residue can be vacuum-dried and roasted at 700° C. in the muffle.

The invention claimed is:

1. A method for the production of an oxide aerogel optionally comprising a dopant, the method comprising:
    reacting an oxide wet gel with an electrophile to generate $CO_2$ gas, thereby providing a porous solid oxide containing the $CO_2$ gas, the porous solid oxide optionally comprising a dopant;
    wherein a liquid component of the oxide wet gel comprises an aqueous alkaline solution that comprises carbonate ions, bicarbonate ions, or a mixture thereof.

2. A method of claim 1, wherein the oxide is silica.

3. A method of claim 1, wherein the electrophile is a reagent which reacts with the oxide wet gel to generate an acid.

4. A method of claim 3, wherein the electrophile is a silylating agent having the formula $R_3SiX$, wherein R is independently at each occurrence selected from a $C_1$-$C_4$ alkyl group and halide; and X is independently selected from halide and sulfate groups.

5. A method of claim 4, wherein the electrophile is trimethylchlorosilane (TMCS).

6. A method of claim 5, wherein the volume ratio of the TMCS to the oxide wet gel is in the range of from 0.01 to 3.

7. A method of claim 1, wherein the aqueous alkaline solution is an aqueous sodium bicarbonate solution.

8. A method of claim 1, wherein the aqueous alkaline solution has a concentration in the range from 1% to 10% w/v.

9. A method of claim 1, wherein the method comprises the step of:
    treating a precursor oxide wet gel with an aqueous alkaline solution comprising carbonate ions, bicarbonate ions, or a mixture thereof to provide an oxide wet gel having a liquid component which comprises the aqueous alkaline solution.

10. A method of claim 9, wherein the method comprises the step of:
    forming the precursor oxide wet gel.

11. A method of claim 1, wherein the method comprises:
    reacting an oxide monomer, an electrophile and an aqueous alkaline solution comprising carbonate ions, bicarbonate ions, or a mixture thereof to generate a porous solid oxide comprising the $CO_2$ gas, the porous solid oxide optionally comprising a dopant.

12. A method of claim 1, wherein the process comprises the step of:
    converting the porous solid oxide containing the $CO_2$ gas into the oxide aerogel.

13. A method of claim 12, wherein the method comprises the step of:
   drying the porous solid oxide containing the $CO_2$ gas to provide the aerogel.

14. A method of claim 13, wherein the drying step comprises heating the porous solid to a temperature of less than 100° C.

15. A method of claim 1, the method comprising the step of:
   powdering the oxide aerogel to form a powdered oxide aerogel.

16. A method of claim 1, wherein the method is a method of making a composite comprising an oxide aerogel.

17. A method of claim 16, wherein the composite is an oxide aerogel-fibre composite and both the oxide wet gel and the porous solid oxide comprise fibres supported in the oxide matrix.

18. A method of claim 1, wherein the method comprises the step of:
   reducing the amount of the dopant in the porous solid oxide to provide a porous solid oxide having a reduced amount of the dopant.

19. A method of claim 18, wherein the step of reducing the amount of the dopant comprises washing the porous solid oxide or the oxide aerogel with water.

20. A method of claim 1, wherein the method comprises the step of:
   reducing the amount of the dopant in the oxide aerogel to provide an oxide aerogel having a reduced amount of the dopant.

* * * * *